US011223838B2

(12) United States Patent
Chen et al.

(10) Patent No.: US 11,223,838 B2
(45) Date of Patent: Jan. 11, 2022

(54) AI-ASSISTED PROGRAMMABLE HARDWARE VIDEO CODEC

(71) Applicant: ALIBABA GROUP HOLDING LIMITED, Grand Cayman (KY)

(72) Inventors: Yen-kuang Chen, San Mateo, CA (US); Lingjie Xu, San Mateo, CA (US); Minghai Qin, San Mateo, CA (US); Ping Chen, San Mateo, CA (US); Xinyang Yu, San Mateo, CA (US); Qinggang Zhou, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/868,065

(22) Filed: May 6, 2020

(65) Prior Publication Data
US 2020/0374534 A1 Nov. 26, 2020

Related U.S. Application Data

(60) Provisional application No. 62/853,049, filed on May 26, 2019.

(51) Int. Cl.
*H04N 19/42* (2014.01)
*H04N 19/137* (2014.01)
*H04N 19/147* (2014.01)
*G06K 9/62* (2006.01)
*H04N 19/176* (2014.01)
*G06N 20/00* (2019.01)
*H04N 19/14* (2014.01)

(52) U.S. Cl.
CPC .......... *H04N 19/42* (2014.11); *G06K 9/6215* (2013.01); *G06N 20/00* (2019.01); *H04N 19/137* (2014.11);
(Continued)

(58) Field of Classification Search
CPC .... H04N 19/42; H04N 19/137; H04N 19/147; H04N 19/176; H04N 19/14;
(Continued)

(56) References Cited

U.S. PATENT DOCUMENTS

| 5,457,780 A * | 10/1995 | Shaw | H04N 21/2383 |
| | | | 345/502 |
| 2003/0174768 A1 * | 9/2003 | Hall | H04N 19/436 |
| | | | 375/240.01 |

(Continued)

OTHER PUBLICATIONS

H. D. Lin, A. Anesko, B. Petryna and G. Pavlovic, "A programmable motion estimator for a class of hierarchical algorithms," VLSI Signal Processing, VIII, 1995, pp. 411-420, doi: 10.1109/VLSISP.1995.527512. (Year: 1995).*

(Continued)

*Primary Examiner* — Marnie A Matt
(74) *Attorney, Agent, or Firm* — Finnegan, Henderson, Farabow, Garrett & & Dunner LLP

(57) ABSTRACT

A video processing apparatus includes a programmable hardware encoder configured to execute an encoding process on a plurality of input video frames. The video processing apparatus further includes a controller coupled with the programmable hardware encoder. The controller is configured to execute a set of instructions to cause the video processing apparatus to: determine first information of the plurality of input video frames, and adjust the encoding process based on the first information.

6 Claims, 14 Drawing Sheets

(52) U.S. Cl.
CPC ........... *H04N 19/14* (2014.11); *H04N 19/147* (2014.11); *H04N 19/176* (2014.11)

(58) Field of Classification Search
CPC .... H04N 19/124; H04N 19/40; H04N 19/174; H04N 19/167; H04N 19/56; G06K 9/6215; G06N 20/00
USPC .................................................. 375/240.24
See application file for complete search history.

(56) References Cited

U.S. PATENT DOCUMENTS

| | | | | |
|---|---|---|---|---|
| 2008/0112489 | A1* | 5/2008 | Malladi | H04N 19/436 375/240.22 |
| 2014/0362922 | A1* | 12/2014 | Puri | H04N 19/167 375/240.16 |
| 2018/0139456 | A1 | 5/2018 | Cheok et al. | |
| 2018/0176570 | A1 | 6/2018 | Rippel et al. | |
| 2019/0075301 | A1* | 3/2019 | Chou | H04N 19/167 375/240.16 |
| 2019/0124348 | A1* | 4/2019 | Yang | G06N 20/20 |
| 2019/0130624 | A1 | 5/2019 | Miao et al. | |

OTHER PUBLICATIONS

PCT International Search Report and Written Opinion dated Jul. 23, 2020, issued in corresponding International Application No. PCT/US2020/031642 (18 pgs ).

* cited by examiner

AI-ASSISTED PROGRAMMABLE HARDWARE VIDEO CODEC

CROSS-REFERENCE TO RELATED APPLICATIONS

This application claims priority to and the benefits of priority to U.S. Provisional Patent Application No. 62/853,049, filed on May 26, 2019, which is incorporated herein by reference in its entirety.

TECHNICAL FIELD

The present disclosure generally relates to video processing, and more particularly, to artificial-intelligence (AI) assisted programmable hardware video codec.

BACKGROUND

Modern video delivery systems constantly encode (e.g., compress) and decode (decompress) video data. For example, to provide fast and high-quality cloud-based video streaming service, video encoders are used to compress digital video signals for reducing transmission bandwidth consumption associated with such signals while preserving the image quality as much as possible. Meanwhile, a user terminal receiving the video streaming can use a video decoder to decompress the coded video signals and then display the decompressed video images.

The video encoder and decoder (collectively referred to as "codec") can be implemented as software or hardware. For example, the codec can be implemented as software running on one or more central processing units (CPUs). Many commercial applications (apps) use CPU-based codecs because the CPU-based codecs do not require specific hardware environments and can be conveniently designed to playback high-quality videos. But the running of CPU-based codec is often slow and power intensive, due to its frequent accesses of memory.

SUMMARY

Embodiments of the present disclosure relate to AI-assisted programmable hardware video codex. In some embodiments, a video processing apparatus is provided. The video processing apparatus includes a programmable hardware encoder configured to execute an encoding process on a plurality of input video frames. The video processing apparatus further includes a controller coupled with the programmable hardware encoder. The controller is configured to execute a set of instructions to cause the video processing apparatus to: determine first information of the plurality of input video frames and adjust the encoding process based on the first information.

In some embodiments, a video processing apparatus is provided. The video processing apparatus includes a programmable hardware decoder configured to execute a decoding process on coded video data, to generate decoded data. The video processing apparatus also includes a controller coupled with the programmable hardware decoder. The controller is configured to execute a set of instructions to cause the video processing apparatus to: determine first information of the coded video data; and adjust the decoding process based on the first information.

Aspects of the disclosed embodiments may include non-transitory, tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DESCRIPTION OF THE EMBODIMENTS

Figure 1:
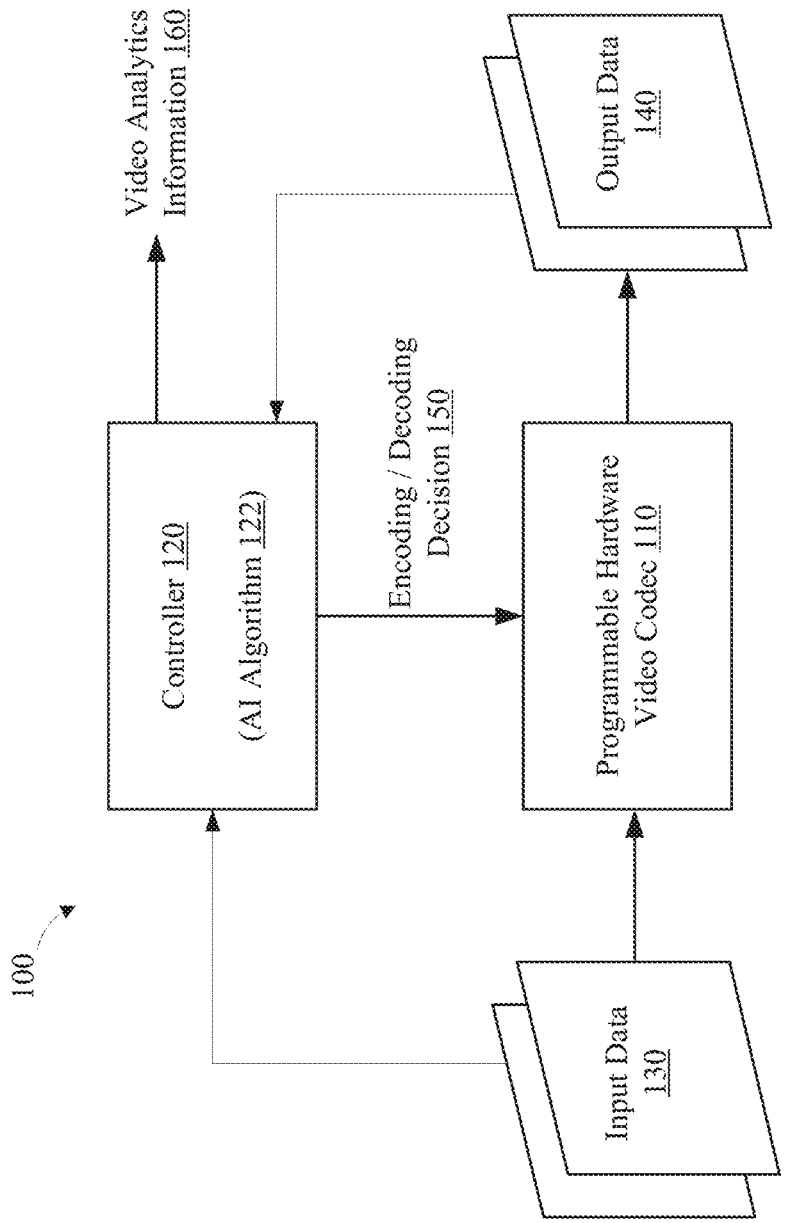
FIG. 1 is a schematic diagram illustrating an AI-assisted and hardware-based video processing system, consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The useful information of a picture being encoded (referred to as a "current picture") includes changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture" or "I-frame." A picture coded using a previous picture as a reference picture is referred to as a "P-picture" or "P-frame." A picture coded using both a previous picture and a future picture as reference pictures (i.e., the reference is "bi-directional") is referred to as a "B-picture" or "B-frame."

As discussed above, video processing is limited by the capacity of the CPU-based codec. To mitigate the problems, software-based codecs can be implemented on dedicated graphics processing units (GPUs). GPUs can perform parallel computation and thus can render images more quickly than a CPU. However, a GPU's bitrate efficiency is physically limited and may limit the video resolution that can be displayed.

Hardware-based codecs are fixed hardware blocks specifically designed for performing a particular video encoding and/or decoding process. Hardware-based codecs often consume less power and have a higher processing speed than software-based codecs. But the function of conventional hardware-based codecs cannot be re-programmed to provide new features or adapt to new requirements.

The disclosed embodiments provide improvements over the conventional codec designs.

FIG. 1 is a schematic diagram illustrating an AI-assisted and hardware-based video processing system 100, according to some disclosed embodiments. As shown in FIG. 1, system 100 includes a programmable hardware codec 110, which can be a hardware encoder, a hardware decoder, or a combination of both. Programmable hardware codec 110 may comprise any hardware components that are reconfigurable, such as field programmable gate arrays (FPGAs), programmable logic devices (PLDs), etc. The circuitry (e.g., logic gates) in programmable hardware codec 110 can be programmed using software. Consistent with the disclosed embodiments, programmable hardware codec 110 may perform a video encoding or decoding process on input data 130 and generate output data 140. For example, programmable hardware codec 110 can be implemented as an encoder to encode (e.g., compress) source video data and output coded (e.g., compressed) data. Additionally or alternatively, programmable hardware codec 110 may be implemented as an decoder to decode (e.g., decompress) the coded video data and output decoded (e.g., decompressed) video data for playback.

Still referring to FIG. 1, a controller 120 is coupled to and in communication with programmable hardware codec 110. Controller 120 may be a processor configured to execute a program code (e.g., an AI algorithm 122) to analyze the input data 130 or output data 140 of programmable hardware codec 110. AI algorithm 122 may include, but is not limited to, machine-learning algorithm, artificial neural network, convolutional neural network, deep neural network, etc.

In some disclosed embodiments, controller 120 may execute AI algorithm 122 to determine an encoding or decoding decision 150 and program programmable hardware codec 110 based on encoding or decoding decision 150. For example, controller 120 may determine a coding mode (e.g., inter prediction or inter prediction) or motion vector based on the input video data of a hardware encoder and use the coding mode to guide the encoding process in the hardware encoder.

In some disclosed embodiments, controller 120 may also execute AI algorithm 122 to generate video analytics information 160 from input data 130 or output data 140. For example, controller 120 may determine the content of decoded video data or track an object in the decoded video data. As another example, controller 120 may identify regions of interest (ROIs) in the input video frames of a hardware encoder and program the hardware encoder to use a higher image quality for the ROIs and a lower image quality for non-ROIs.

Figure 2:
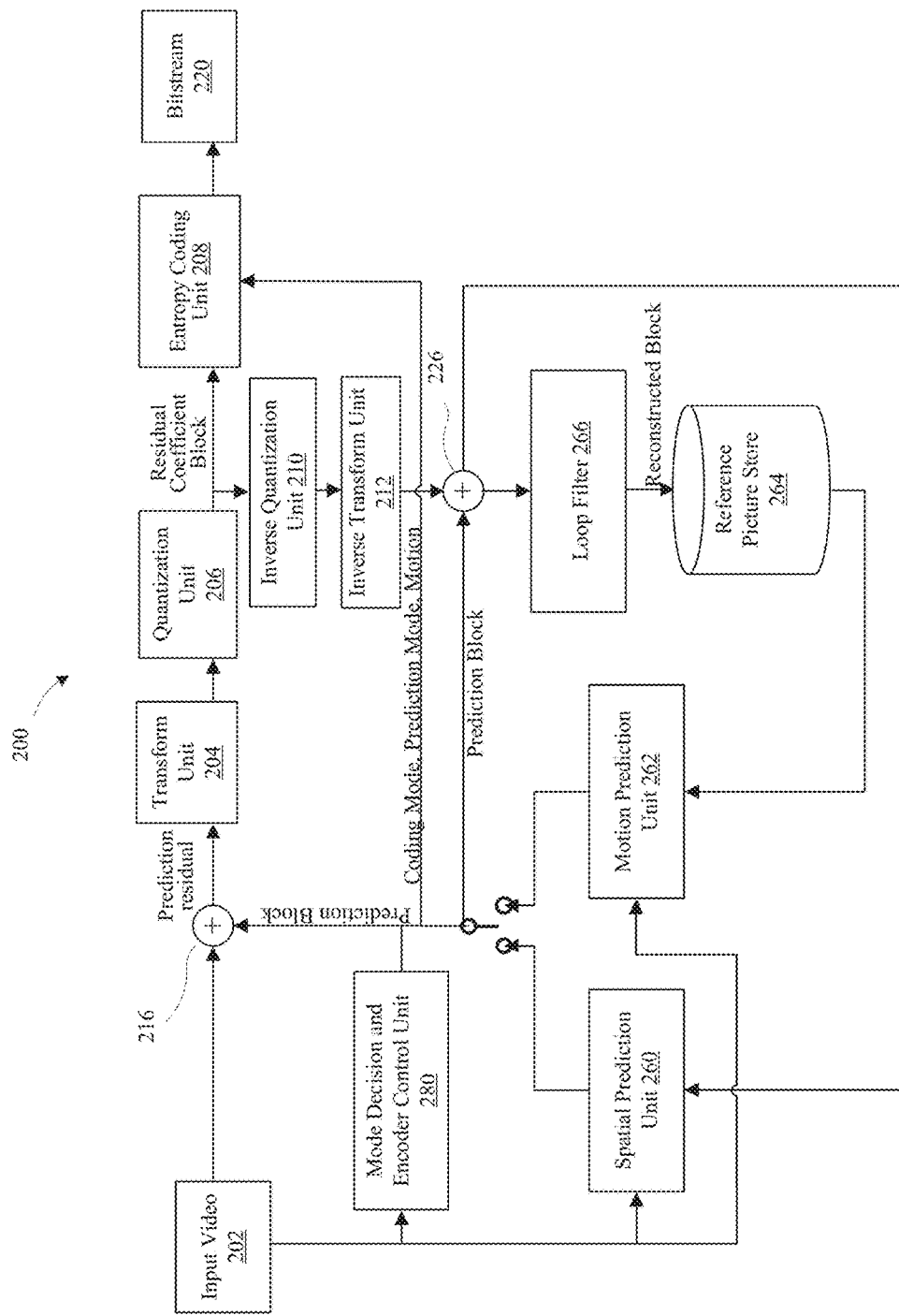
FIG. 2 is a schematic diagram illustrating an exemplary hardware video encoder, consistent with embodiments of the present disclosure.

FIG. 2 is a schematic diagram illustrating an exemplary hardware video encoder 200, consistent with the disclosed embodiments. For example, video encoder 200 may be implemented as part of programmable hardware codec 110 in system 100 (FIG. 1). Video encoder 200 may perform intra- or inter-coding of blocks within video frames, including video blocks, or partitions or sub-partitions of video blocks. Intra-coding may rely on spatial prediction to reduce or remove spatial redundancy in video within a given video frame. Inter-coding may rely on temporal prediction to reduce or remove temporal redundancy in video within adjacent frames of a video sequence. Intra modes may refer to a number of spatial based compression modes and inter modes (such as uni-prediction or bi-prediction) may refer to a number of temporal-based compression modes.

Referring to FIG. 2, input video signal 202 may be processed block by block. For example, the video block unit may be a 16×16 pixel block (e.g., a macroblock (MB)). In HEVC, extended block sizes (e.g., a coding unit (CU)) may be used to compress video signals of resolution, e.g., 1080p and beyond. In HEVC, a CU may include up to 64×64 luma samples and corresponding chroma samples. In VVC, the size of a CU may be further increased to include 128×128 luma samples and corresponding chroma samples. A CU may be partitioned into prediction units (PUs), for which separate prediction methods may be applied. Each input video block (e.g., MB, CU, PU, etc.) may be processed by using spatial prediction unit 260 or temporal prediction unit 262.

Spatial prediction unit 260 performs spatial prediction (e.g., intra prediction) to the current CU using information on the same picture/slice containing the current CU. Spatial prediction may use pixels from the already coded neighboring blocks in the same video picture/slice to predict the current video block. Spatial prediction may reduce spatial redundancy inherent in the video signal. Temporal prediction (e.g., inter prediction or motion compensated prediction) may use samples from the already coded video pictures to predict the current video block. Temporal prediction may reduce temporal redundancy inherent in the video signal.

Temporal prediction unit 262 performs temporal prediction (e.g., inter prediction) to the current CU using information from picture(s)/slice(s) different from the picture/slice containing the current CU. Temporal prediction for a video block may be signaled by one or more motion vectors. The motion vectors may indicate the amount and the direction of motion between the current block and one or more of its prediction block(s) in the reference frames. If multiple reference pictures are supported, one or more reference picture indices may be sent for a video block. The one or more reference indices may be used to identify from which reference picture(s) in the reference picture store or Decoded Picture Buffer (DPB) 264, the temporal prediction signal may come. After spatial or temporal prediction, the mode decision and encoder control unit 280 in the encoder may choose the prediction mode, for example based on a rate-distortion optimization method. The prediction block may be subtracted from the current video block at adder 216. The prediction residual may be transformed by transformation unit 204 and quantized by quantization unit 206. The quantized residual coefficients may be inverse quantized at inverse quantization unit 210 and inverse transformed at inverse transform unit 212 to form the reconstructed residual. The reconstructed block may be added to the prediction block at adder 226 to form the reconstructed video block. The in-loop filtering, such as deblocking filter and adaptive loop filters 266, may be applied on the reconstructed video block before it is put in the reference picture store 264 and used to code future video blocks. To form the output video bitstream 220, coding mode (e.g., inter or intra), prediction mode information, motion information, and quantized residual coefficients may be sent to the entropy coding unit 208 to be compressed and packed to form the bitstream 220.

Consistent with the disclosed embodiments, the above-described units of video encoder 200 are implemented as hardware components, e.g., different circuitry blocks for performing the respective functions.

Figure 3:
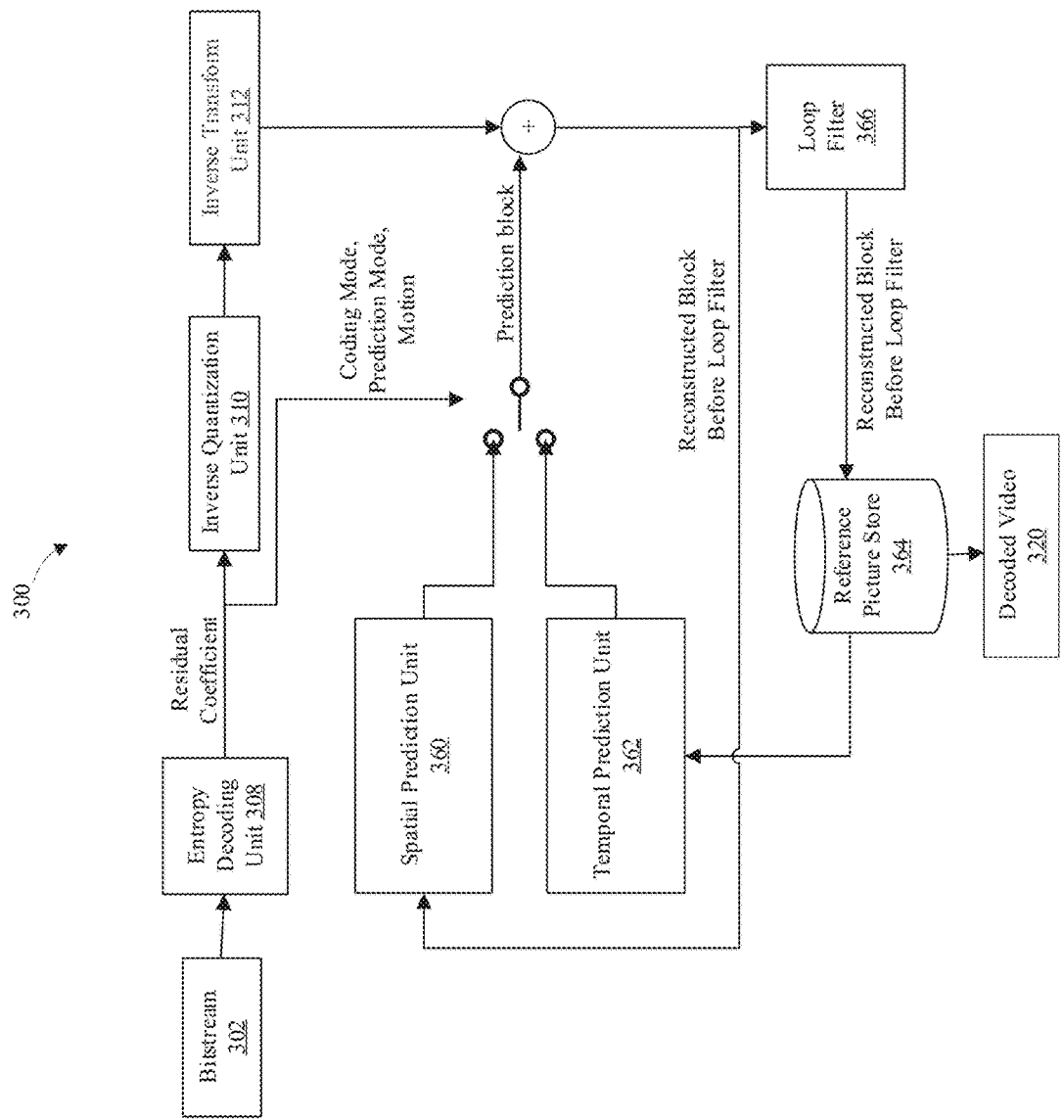
FIG. 3 is a schematic diagram illustrating an exemplary hardware video decoder, consistent with embodiments of the present disclosure.

FIG. 3 is a schematic diagram illustrating an exemplary hardware video decoder 300, consistent with the disclosed embodiments. For example, video decoder 300 may be used as programmable hardware codec 110 in system 100 (FIG. 1). Referring to FIG. 3, a video bitstream 302 may be unpacked or entropy decoded at entropy decoding unit 308. The coding mode or prediction information may be sent to the spatial prediction unit 360 (e.g., if intra coded) or the temporal prediction unit 362 (e.g., if inter coded) to form the prediction block. If inter coded, the prediction information may comprise prediction block sizes, one or more motion vectors (e.g., which may indicate direction and amount of motion), or one or more reference indices (e.g., which may indicate from which reference picture the prediction signal is to be obtained).

Motion compensated prediction may be applied by the temporal prediction unit 362 to form the temporal prediction block. The residual transform coefficients may be sent to inverse quantization unit 310 and inverse transform unit 312 to reconstruct the residual block. The prediction block and the residual block may be added together at 326. The reconstructed block may go through in-loop filtering (via loop filer 366) before it is stored in reference picture store 364. The reconstructed video in the reference picture store 364 may be used to drive a display device or used to predict future video blocks. Decoded video 320 may be displayed on a display.

In some disclosed embodiments, the above-described units of video decoder 300 are implemented as hardware components, e.g., different circuitry blocks for performing the respective functions.

Consistent with the disclosed embodiments, controller 120 (FIG. 1) can constantly access the encoding process executed by programmable hardware encoder 200 (FIG. 2) and access the decoding process executed by programmable hardware decoder 300 (FIG. 3). Controller 120 can determine non-pixel information from the encoding/decoding process and program programmable hardware encoder 200 and programmable hardware decoder 300 based on the non-pixel information.

Figure 4B:
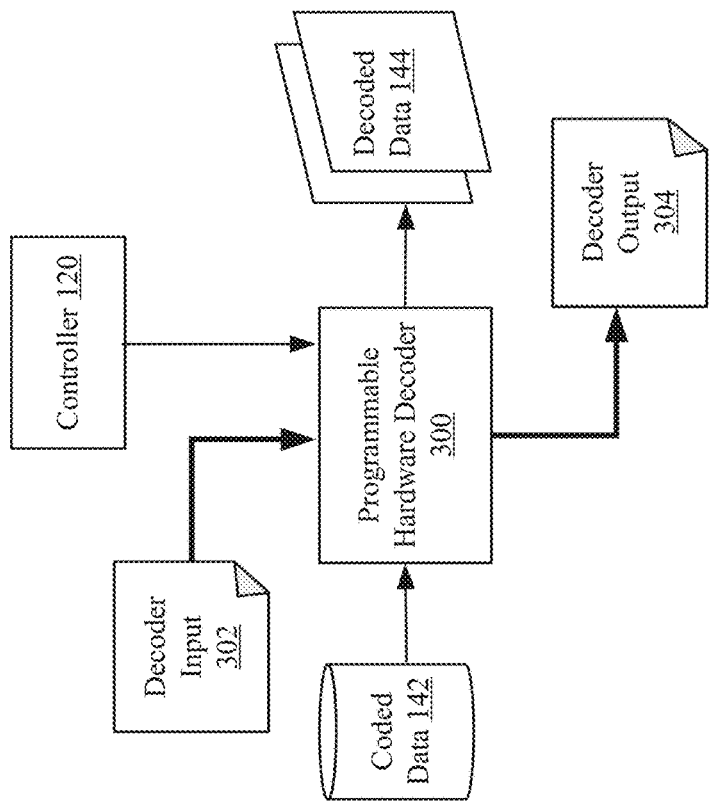
FIG. 4B is a schematic diagram illustrating interaction of a controller and a programmable hardware encoder, consistent with embodiments of the present disclosure.
Figure 4A:
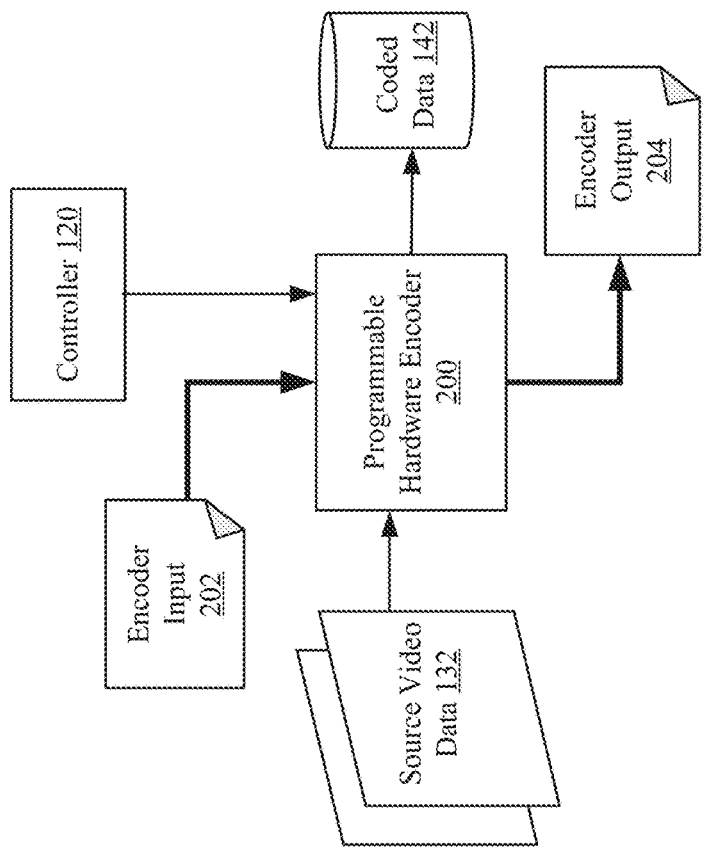
FIG. 4A is a schematic diagram illustrating interaction of a controller and a programmable hardware encoder, consistent with embodiments of the present disclosure.

FIG. 4A is a schematic diagram illustrating the interaction of controller 120 and programmable hardware encoder 200, consistent with the disclosed embodiments. As shown in FIG. 4A, controller 120 can execute an AI algorithm to analyze source video data 132 inputted to programmable hardware encoder 200 and determine non-pixel information (e.g., ROIs, segmentation information, prediction mode, motion vector, etc.) based on source video data 132. Controller 120 can then provide the non-pixel information as encoder input 202 to programmable hardware encoder 200, so that programmable hardware encoder 200 can execute the encoding processing based on encoder input 202. In addition, controller 120 can execute the AI algorithm to extract non-pixel information (e.g., prediction mode and motion vector used by the encoding process) as encoder output 204, which can be used to guide future encoding or decoding processes.

FIG. 4B is a schematic diagram illustrating the interaction of controller 120 and programmable hardware decoder 300, consistent with the disclosed embodiments. As shown in FIG. 4B, controller 120 can then provide the non-pixel information as decoder input 302 (e.g., information regarding errors present in coded video frames) to programmable hardware encoder 200, so that programmable hardware decoder 300 can execute the decoding processing based on decoder input 302. In addition, controller 120 can extract non-pixel information (e.g., prediction mode and motion vector determined by the encoding process) as decoder output 304, which can be used to guide future encoding or decoding processes.

Next, various embodiments of using AI to guide the encoding and decoding processes are described in detail.

In some embodiments, controller 120 may determine parameters for use in a video encoding process and then send the parameters to programmable hardware encoder 200, which uses the parameters to perform the encoding process. Consistent with these embodiments, programmable hardware encoder 200 is only allowed to make limited encoding decisions, while most of the encoding decisions are made by controller 120 with assistance of, e.g., AI algorithm. Controller 120 provides the encoding decisions as encoder input to guide the encoding process in programmable hardware encoder 200.

For example, controller 120 can determine an initial motion vector for a coding block and determine a search range for the motion vector. Controller 120 can then feed the determined parameters to programmable hardware encoder 200, which uses the initial motion vector and the search range to execute the encoding process.

As another example, controller 120 can receive an estimated motion vector or an estimated rate-distortion from programmable hardware encoder 200. Controller 120 can determine an optimized coding mode or an optimized motion vector based on the received estimated motion vector or rate-distortion. Controller 120 then sends the optimized coding mode or optimized motion vector to programmable hardware encoder 200 to guide the encoding process.

As another example, controller 120 can make a coding-tree-unit (CTU) recommendation for programmable hardware encoder 200. In particular, controller 120 can determine a CTU structure and send information about the CTU structure to programmable hardware encoder 200.

In some embodiments, controller 120 can detect the ROIs in an input video frame to programmable hardware encoder 200. The ROI information is then provided as encoder input to programmable hardware encoder 200, which can be programmed to use higher image quality (i.e., higher computational complexity) for ROIs and use lower image quality (i.e., lower computational complexity) for non-ROIs. The computational complexity determines the amount of CPU allocated for searching motion mode (e.g., inter prediction or intra prediction), motion vector, code-unit (CU) partition, transform-unit partition, etc.

Figure 5:
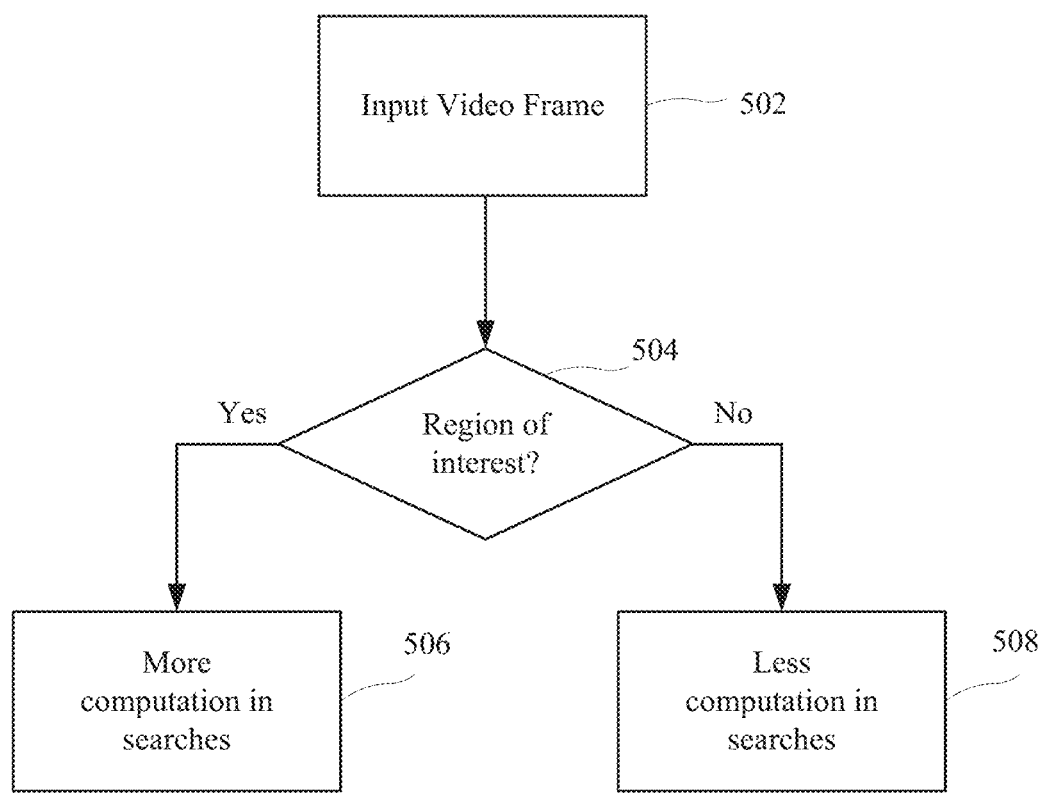
FIG. 5 is a flowchart of a process of using region-of-interest (ROI) information to guide an encoding process, consistent with embodiments of the present disclosure.

FIG. 5 is a flowchart of a process of using ROI information to guide the encoding process, consistent with the disclosed embodiments. Referring to FIG. 5, controller 120 receives an input video frame (step 502) and detects whether there is any ROIs in the input video frame (step 504). For ROIs, controller 120 can program programmable hardware encoder 200 to allocate more computation time for searching the encoding parameters (step 506). In contrast, for non-ROIs, controller 120 can program programmable hardware encoder 200 to allocate less computation time for searching the encoding parameters (step 508).

In some embodiments, controller 120 can determine a semantic segmentation map for an input video frame. Information regarding the segmentation is then provided as encoder input to programmable hardware encoder 200, which can be programmed to select a partition size or a coding mode based on the segmentation map. For example, controller 120 can program programmable hardware encoder 200 to use a smaller CT/TU around the segmentation boundaries, while use larger CU/TU within the segmentation (unless the segmentation is a non-rigid object). As another example, controller 120 can program programmable hardware encoder 200 to use higher correlation for coding modes or motion vectors within the same segmentation.

Figure 6:
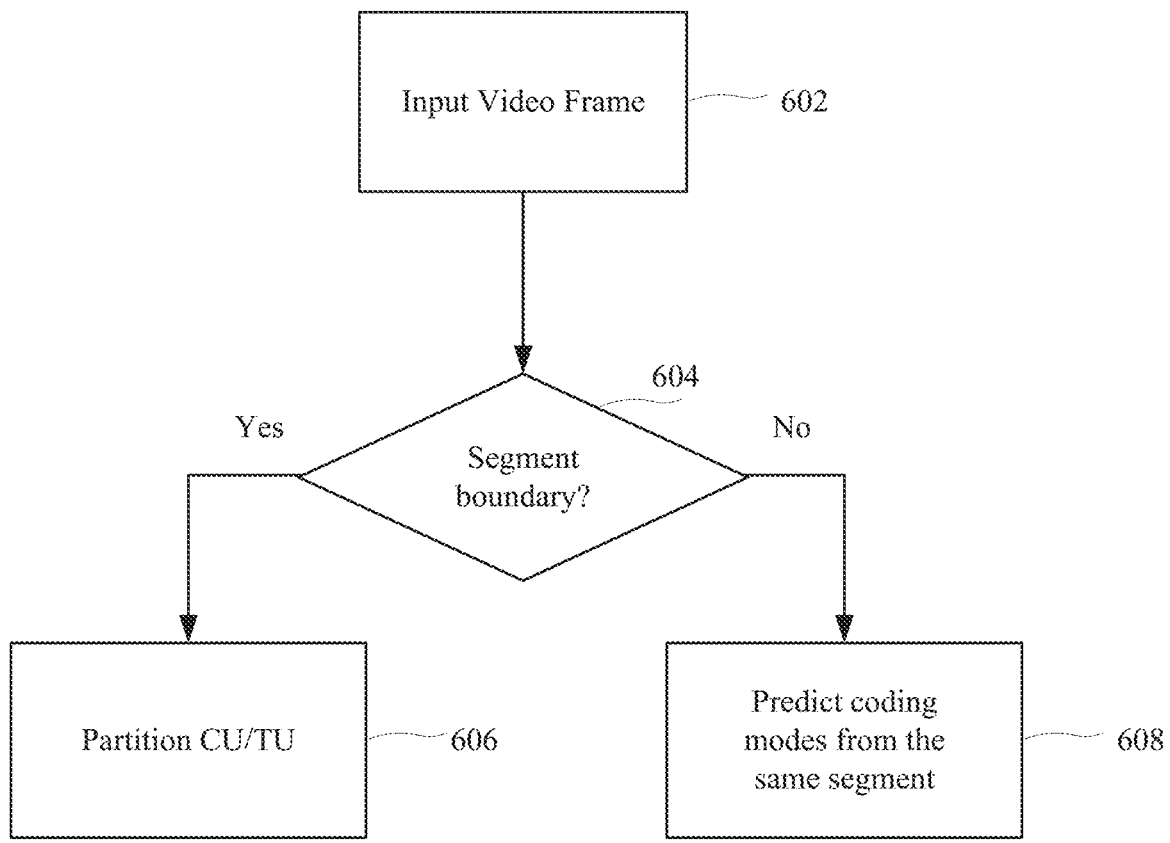
FIG. 6 is a flowchart of a process of using semantic segmentation to guide a encoding process, consistent with embodiments of the present disclosure.

FIG. 6 is a flowchart of a process of using semantic segmentation to guide the encoding process, consistent with the disclosed embodiments. Referring to FIG. 6, controller 120 receives an input video frame (step 602) and determines a semantic segmentation map for the input video frame. Controller 120 can send information regarding the segmentation map to programmable hardware encoder 200 and program programmable hardware encoder 200 to detect the boundaries of the segmentation (step 604). Programmable hardware encoder 200 can use smaller CT/TU partition sizes around the segment boundaries (step 606). Moreover, programmable hardware encoder 200 can predict a coding mode for a coding block within the segment, based on the coding modes used for other coding blocks within the same segment (step 608).

Figure 7:
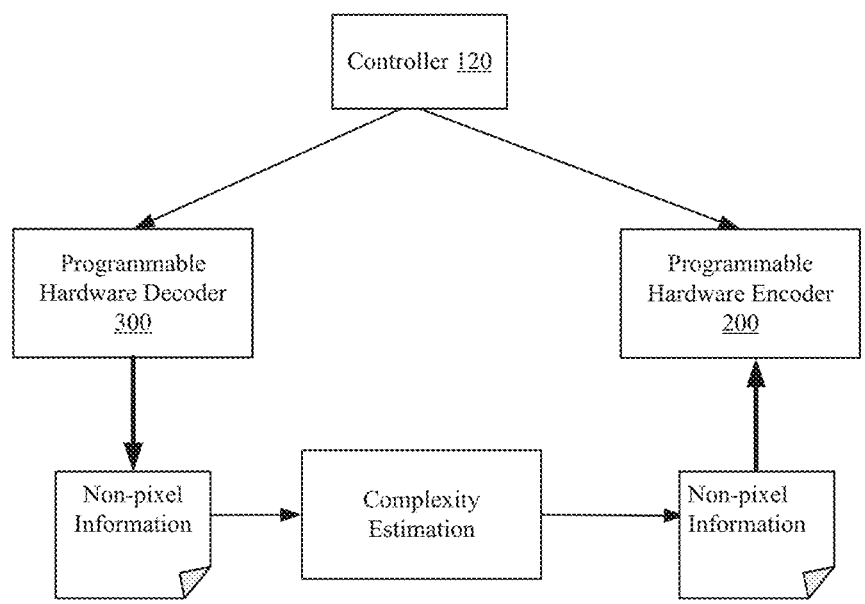
FIG. 7 is a schematic diagram illustrating a process for estimate computational complexity in a transcoding process, consistent with embodiments of the present disclosure.

In some embodiments, during a transcoding process, controller 120 may extract non-pixel information from a decoder and use the non-pixel information to guide the encoding process in programmable hardware encoder 200. For example, as illustrated in FIG. 7, controller 120 can estimate the computational complexity suitable for transcoding pictures based on previously encoded bitstreams. Specifically, while a decoder is used to decode the previously encoded bitstreams, controller 120 receives, from the decoder, information indicating the number of bits and an average quantization parameter used for encoding a video frame. Controller 120 can then estimate picture complexity (e.g., computational complexity) based on the number of bits or the average quantization parameter. Finally, controller 120 can program programmable hardware encoder 200 to perform rate-control based on the picture complexity.

Figure 8:
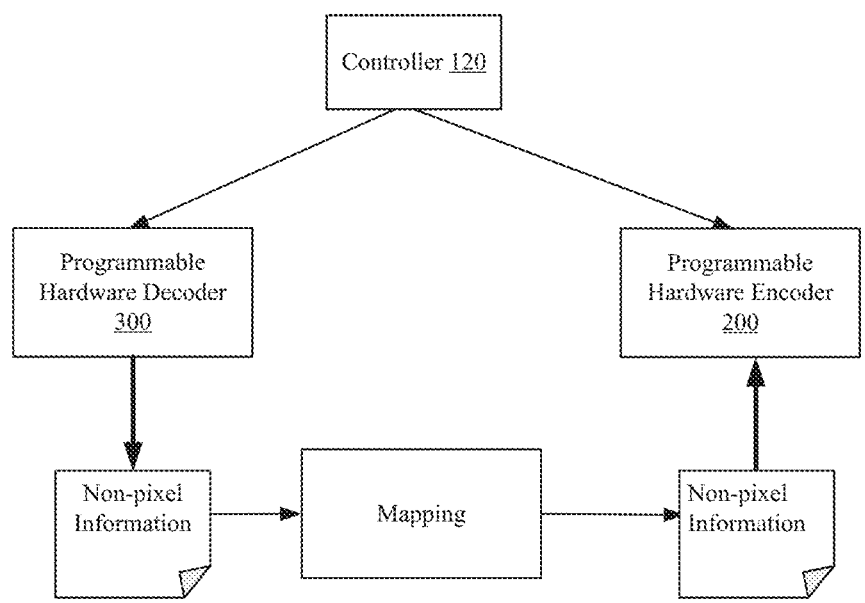
FIG. 8 is a schematic diagram illustrating a process for mapping coding parameters in a transcoding process, consistent with embodiments of the present disclosure.

In some embodiments, during a transcoding process, controller 120 may map the coding parameters used for the previously encoded bitstreams to coding parameters used for encoding the newly encoded bitstreams, so as to reduce the amount of time needed for searching the inter or intra prediction during the transcoding process. For example, as illustrated in FIG. 8, while a decoder is used to decode the previously encoded bitstreams, controller 120 receives, from the decoder, information indicating at least one of an original motion vector or an original coding mode used for a video frame. Controller 120 then resizes the original motion vector or the original coding mode to a target motion vector or a target coding mode, respectively, according to the target format or definition of the transcoded video data. Finally, controller 120 can program programmable hardware encoder 200 to use the target motion vector or the target coding mode to perform motion estimation or mode decision.

Figure 9:
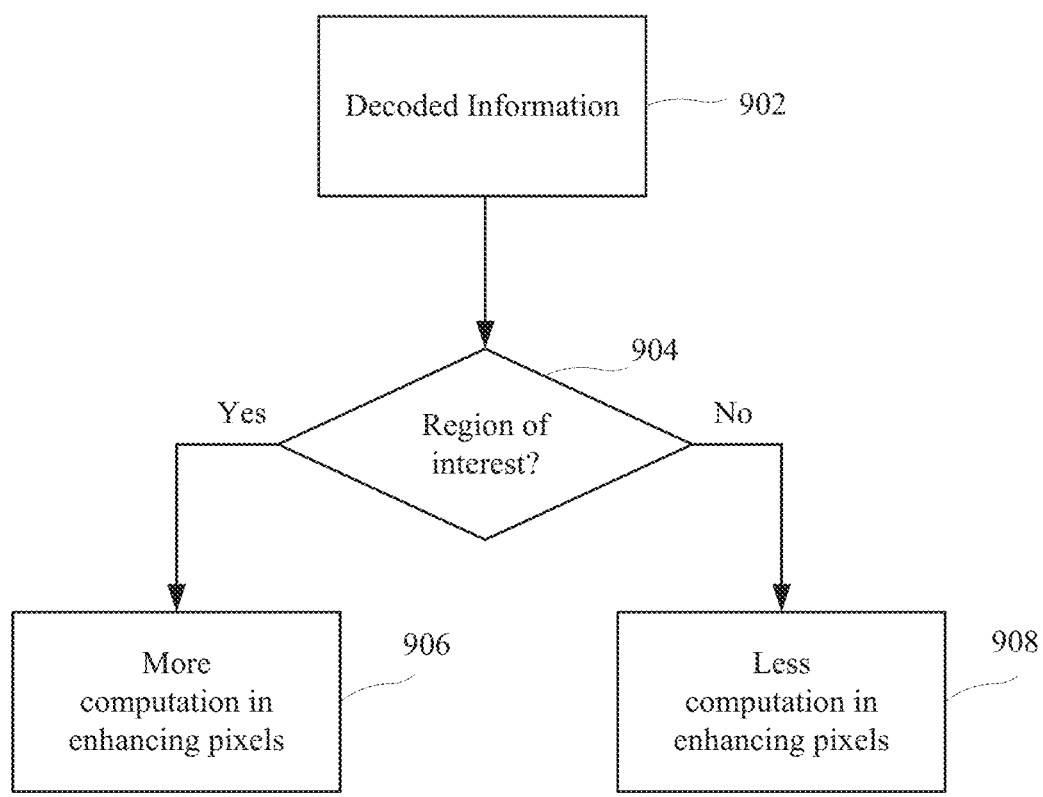
FIG. 9 is a schematic diagram illustrating a process for enhancing pixels in a transcoding process, consistent with embodiments of the present disclosure.

In some embodiments, during a transcoding process, controller 120 may use partially decoded information to guide the subsequent encoding. For example, as illustrated in FIG. 9, while a decoder is used to decode the previously encoded bitstreams, controller 120 receives, from the decoder, decoded information such as motion vectors or quantization parameters (step 902). Controller 120 can detect ROIs in the decoded video frames based on the decoded information (step 904). Then, during the subsequent encoding to the new video format or definition, controller 120 can program hardware encoder 200 to adaptively enhance the image based on the ROIs. Specifically, controller 120 can program hardware encoder 200 to allocate more computation time to enhance the pixels in the ROI (step 906), while use less computation time to enhance the pixels in non-ROIs (step 908).

Figure 10:
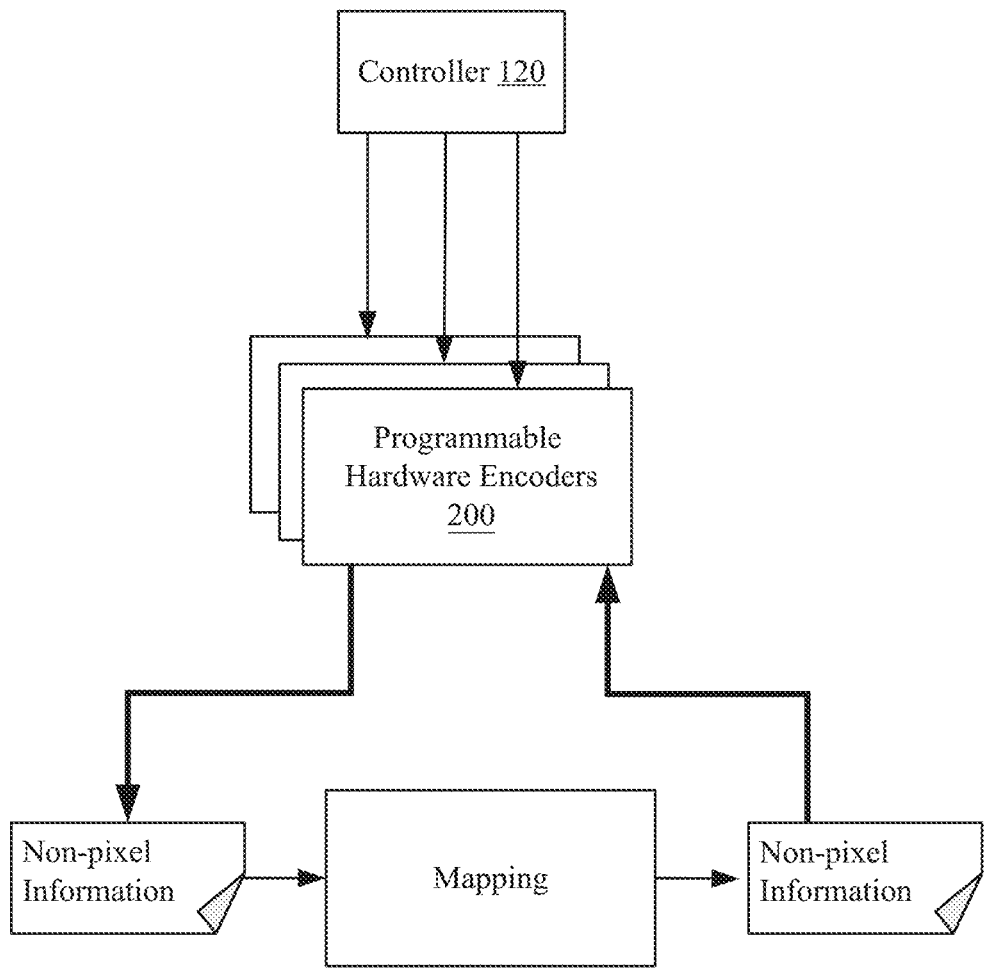
FIG. 10 is a schematic diagram illustrating a process for mapping coding parameters in a parallel encoding process, consistent with embodiments of the present disclosure.

In some embodiments, when multiple encoders are used to perform parallel video encoding, controller 120 can extract the common information of the parallel encoding and share it among the multiple encoders, so as to increase encoding efficiency. For example, as illustrated in FIG. 10, controller 120 can receive a coding parameter (e.g., a motion vector or a coding mode) used by a first programmable hardware encoder that is involved in a parallel video encoding process. Since the coding parameters for encoding different bitstreams may be similar, controller 120 may map the coding parameter received from the first programmable hardware encoder to coding parameters suitable for using in other programmable hardware encoders involved in the parallel video encoding process. Controller 120 can then send the mapped coding parameters to the other programmable hardware encoders, to guide the respective encoding processes.

In some embodiments, controller 120 can use audio cue to guide the encoding process in programmable hardware encoder 200. For example, controller 120 can assign a weight to an input video frame based on audio information associated with the video frame. Controller 120 then determines an image quality proportional to the weight, and program programmable hardware encoder 200 to encode the input video frame according to the determined video quality. For example, when the associated audio cue is exciting, controller 120 may choose to perform higher-quality compression.

In some embodiments, controller 120 can determine a group of pictures (GOP) to guide the encoding process in programmable hardware encoder 200. Specifically, controller 120 can determine a first un-coded I-frame in a plurality of input video frames. For example, this initial I-frame may be detected using an AI algorithm. Alternatively, if a transcoding process is involved, controller 120 may determine, from the decoded information, intra CUs for the plurality of input video frames and determine the first un-coded I-frame based on the intra CUs. After the first un-coded I-frame is determined, controller 120 determines one or more additional un-coded I-frames in the plurality of input video frames. Controller 120 further indexes the first and additional un-coded I-frames and determines a GOP based on the indexes of un-coded I-frames. Finally, controller 120 can program programmable hardware encoder 200 to encode the plurality of input video frames using the determined GOP.

In some embodiments, controller 120 can use an AI algorithm (e.g., a reinforcement-leaning algorithm) to analyze the similarities between different input video frames of programmable hardware encoder 200 and to estimate bit budget based on the similarity. Specifically, controller 120 can determine similarity of a plurality of input video frames of the encoder. Controller 120 can then assign a bit budget to each of the plurality of input video frames, based on the similarity of the plurality of input video frames. Controller 120 can further send the bit budgets to programmable hardware encoder 200, which encodes the plurality of input video frames according to the corresponding bit budgets.

In some embodiments, controller 120 can use an AI algorithm (e.g., a reinforcement-leaning algorithm) to analyze similarities between different input video frames of programmable hardware encoder 200 and to determine reference frames based on the similarities. Specifically, controller 120 can determine similarity of a plurality of input video frames of the encoder. Controller 120 can then determine one or more reference frames, based on the similarities of the plurality of input video frames. Controller 120 can further send information of the one or more reference frames to programmable hardware encoder 200, which encodes the plurality of input video frames using the one or more reference frames.

In some embodiments, controller 120 can use ROI or segmentation information to define coding units or prediction units. Specifically, controller 120 can generate a segmentation of an input video frame of the encoder. Controller 120 can then set at least one of a coding unit or a prediction unit based on the segmentation of the input video frame. Controller 120 can further send information of the at least one of the coding unit or the prediction unit to programmable hardware encoder 120, which executes the encoding processing using the at least one of the coding unit or the prediction unit.

Figure 11:
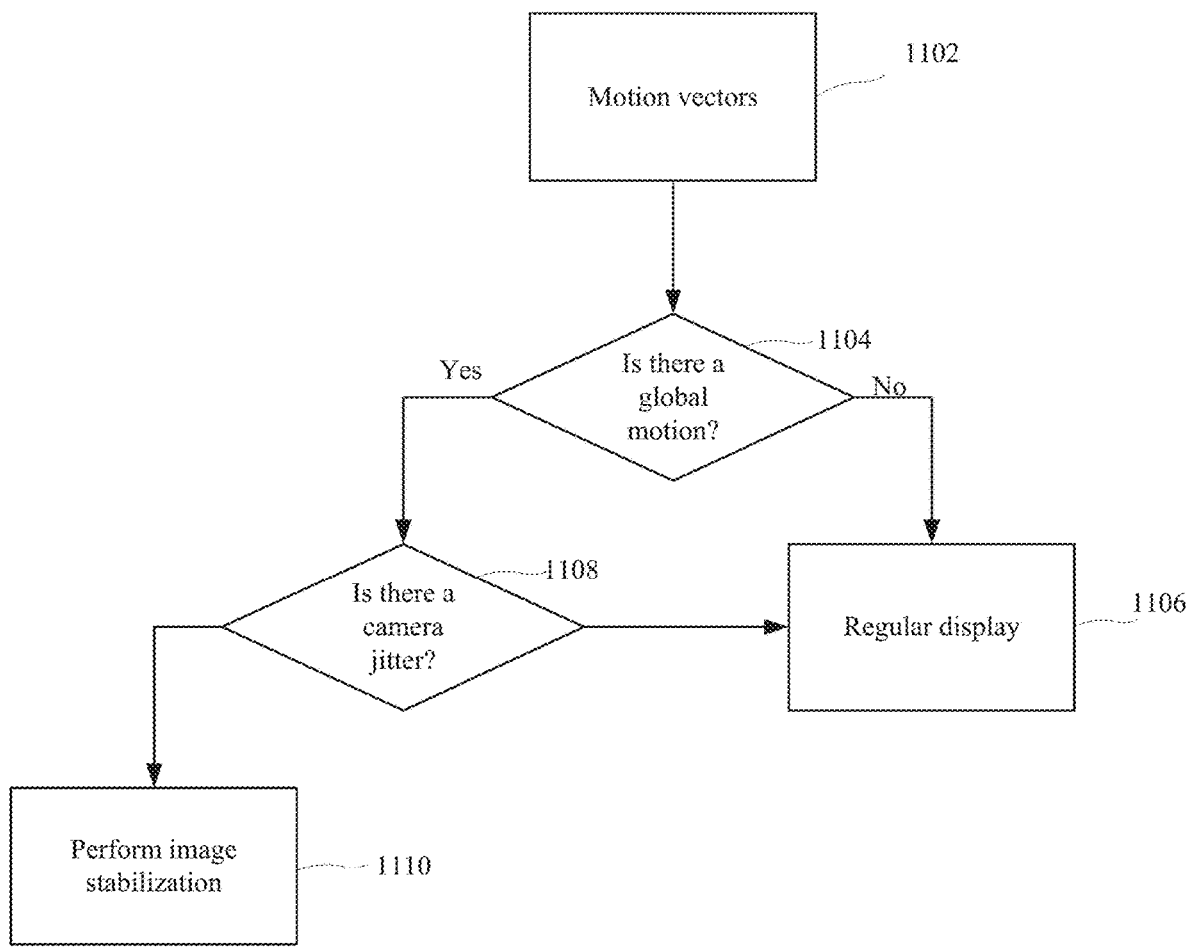
FIG. 11 is a schematic diagram illustrating a process for performing video stabilization in decoded video data, consistent with embodiments of the present disclosure.

In some embodiments, controller 120 can use decoded information (i.e., decoder output) to perform video stabilization. Since camera jitter can cause a global motion of a picture, video stabilization can be used to correct the effect introduced by camera jitter. For example, as illustrated in FIG. 11, controller 120 can receive, from programmable hardware decoder 300, a plurality of motion vectors associated with a plurality of coding blocks in a coded frame (step 1102). Controller 120 can then determine a global motion parameter for the coded frame, based on the plurality of motion vectors (step 1104). If the global motion parameter indicates there is no global motion, controller 120 concludes that the image corresponding to the coded frame can be displayed normally (step 1106). If the global motion parameter indicates that global motion exists, controller 120 can further determine whether a camera jitter is present in the decoded data (step 1108). If a camera jitter is determined to be present in the coded frame, controller 120 can perform image stabilization on the decoded data, based on the global motion parameter (step 1110). If it is determined that no camera jitter is present in the coded frame, controller 120 concludes that the image corresponding to the coded frame can be displayed normally (step 1106).

In some embodiments, controller 120 can use decoded information (i.e., decoder output) to track objects in the decoded video data or understand contents of the decoded video data. Specifically, controller 120 can receive, from programmable hardware decoder 300, decoded information such as motion vectors, residues, etc. Controller can then use an AI algorithm to recognize and track objects represented by the decoded video data, based on the decoded information. For example, controller 120 can perform scene extraction, face filtering, attribute extraction, etc., to monitor the content of the images and create annotations for the images.

In some embodiments, controller 120 can use decoded information guide error concealment in the decoding process. For example, controller 120 can receive, from programmable hardware decoder 300, a plurality of motion vectors and coding modes associated with a plurality of coding blocks in a coded frame. Controller 120 can then determine a method to conceal error, based on the plurality of motion vectors and coding modes. In response to an error being determined to be present in the coded frame, controller 120 can further program programmable hardware decoder 300 to perform error concealment in the decoding process, based on the determined method to conceal error.

Figure 12:
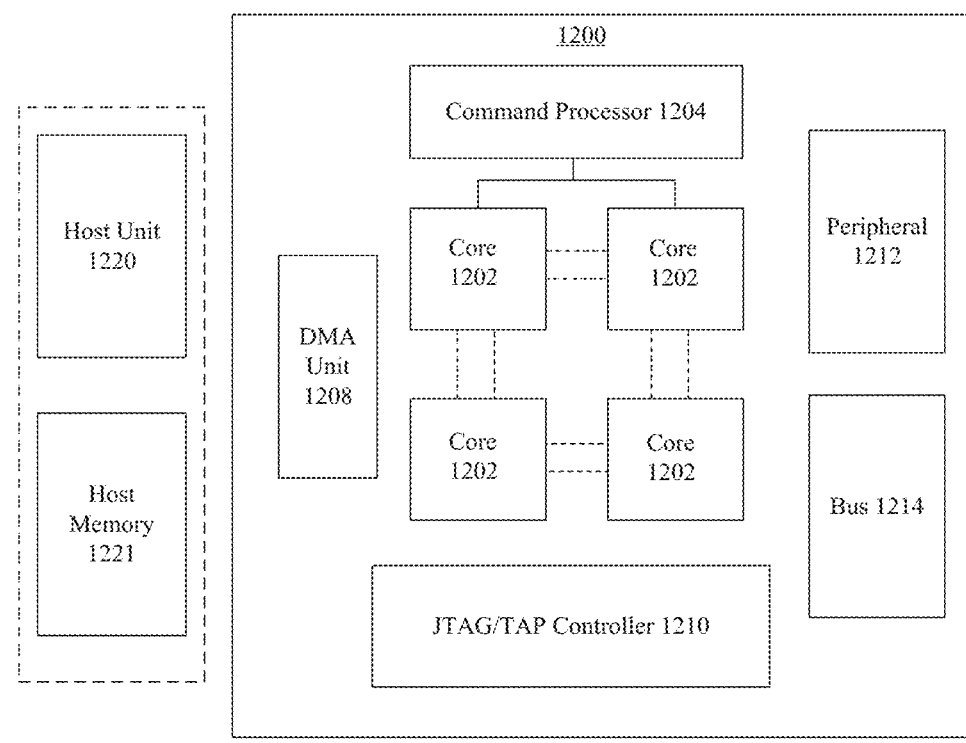
FIG. 12 is a schematic diagram illustrating an exemplary AI controller architecture suitable for use in the AI-assisted and hardware-based video processing system of FIG. 1, consistent with embodiments of the present disclosure.

FIG. 12 illustrates an exemplary AI controller 1200 suitable for executing an AI algorithm, consistent with embodiments of the present disclosure. For example, AI controller 1200 may be configured as controller 120 (FIG. 1) for performing the disclosed methods. In the context of this disclosure, AI controller 1200 may be implemented as a dedicated hardware accelerator for performing complex AI algorithms, such as machine learning algorithms, artificial neural networks (e.g., convolutional neural network), or deep learning algorithms. In some embodiments, AI controller 1200 may be referred to as a neural network processing unit (NPU). As shown in FIG. 12, AI controller 1200 can include a plurality of cores 1202, a command processor 1204, a direct memory access (DMA) unit 1208, a Joint Test Action Group (JTAG)/Test Access End (TAP) controller 1210, a peripheral interface 1212, a bus 1214, and the like.

It is appreciated that, cores 1202 can perform algorithmic operations based on communicated data. Cores 1202 can include one or more processing elements that may include single instruction, multiple data (SIMD) architecture including one or more processing units configured to perform one or more operations (e.g., multiplication, complex multiplication, addition, multiply-accumulate, etc.) based on commands received from command processor 1204. To perform the operation on the communicated data packets, cores 1202 can include one or more processing elements for processing information in the data packets. Each processing element may comprise any number of processing units. According to some embodiments of the present disclosure, AI controller 1200 may include a plurality of cores 1202, e.g., four cores. In some embodiments, the plurality of cores 1202 can be communicatively coupled with each other. For example, the plurality of cores 1202 can be connected with a single directional ring bus, which supports efficient pipelining for large neural network models. The architecture of cores 1202 will be explained in detail with respect to FIG. 13.

Command processor 1204 can interact with a host unit 1220 and pass commands and data to corresponding core 1202. In some embodiments, command processor 1204 can interact with host unit under the supervision of kernel mode driver (KMD). In some embodiments, command processor 1204 can modify the commands to each core 1202, so that cores 1202 can work in parallel as much as possible. The modified commands can be stored in an instruction buffer. In some embodiments, command processor 1204 can be configured to coordinate one or more cores 1202 for parallel execution.

DMA unit 1208 can assist with transferring data between host memory 1221 and AI controller 1200. For example, DMA unit 1208 can assist with loading data or instructions from host memory 1221 into local memory of cores 1202. DMA unit 1208 can also assist with transferring data between multiple AI controllers. DMA unit 1208 can allow off-chip devices to access both on-chip and off-chip memory without causing a host CPU interrupt. In addition, DMA unit 1208 can assist with transferring data between components of AI controller 1200. For example, DMA unit 1208 can assist with transferring data between multiple cores 1202 or within each core. Thus, DMA unit 1208 can also generate memory addresses and initiate memory read or write cycles. DMA unit 1208 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst. It is appreciated that AI controller 1200 can include a second DMA unit, which can be used to transfer data between other AI controllers to allow multiple AI controllers to communicate directly without involving the host CPU.

JTAG/TAP controller 1210 can specify a dedicated debug port implementing a serial communications interface (e.g., a JTAG interface) for low-overhead access to AI controller 1200 without requiring direct external access to the system address and data buses. JTAG/TAP controller 1210 can also have on-chip test access port interface (e.g., a TAP interface) that implements a protocol to access a set of test registers that present chip logic levels and device capabilities of various parts.

Peripheral interface 1212 (such as a PCIe interface), if present, serves as an (and typically the) inter-chip bus, providing communication between AI controller 1200 and other devices (e.g., a host system).

Bus 1214 (such as a I$^2$C bus) includes both intra-chip bus and inter-chip buses. The intra-chip bus connects all internal components to one another as called for by the system architecture. While not all components are connected to every other component, all components do have some connection to other components they need to communicate with. The inter-chip bus connects AI controller 1200 with other devices, such as the off-chip memory or peripherals. For example, bus 1214 can provide high speed communication across cores and can also connect cores 1202 with other units, such as the off-chip memory or peripherals. Typically, if there is a peripheral interface 1212 (e.g., the inter-chip bus), bus 1214 is solely concerned with intra-chip buses, though in some implementations it could still be concerned with specialized inter-bus communications.

AI controller 1200 can also communicate with a host unit 1220. Host unit 1220 can be one or more processing units (e.g., an X86 central processing unit). As shown in FIG. 12, host unit 1220 may be associated with host memory 1221. In some embodiments, host memory 1221 may be an integral memory or an external memory associated with host unit 1220. In some embodiments, host memory 1221 may comprise a host disk, which is an external memory configured to provide additional memory for host unit 1220. Host memory 1221 can be a double data rate synchronous dynamic random-access memory (e.g., DDR SDRAM) or the like. Host memory 1221 can be configured to store a large amount of data with slower access speed, compared to the on-chip memory integrated within AI controller 1200, acting as a higher-level cache. The data stored in host memory 1221 may be transferred to AI controller 1200 to be used for executing neural network models.

In some embodiments, a host system having host unit 1220 and host memory 1221 can comprise a compiler (not shown). The compiler is a program or computer software that transforms computer codes written in one programming language into instructions for AI controller 1200 to create an executable program. In machine learning applications, a compiler can perform a variety of operations, for example, pre-processing, lexical analysis, parsing, semantic analysis, conversion of input programs to an intermediate representation, initialization of a neural network, code optimization, and code generation, or combinations thereof. For example, the compiler can compile a neural network to generate static parameters, e.g., connections among neurons and weights of the neurons.

In some embodiments, host system including the compiler may push one or more commands to AI controller 1200. As discussed above, these commands can be further processed by command processor 1204 of AI controller 1200, temporarily stored in an instruction buffer of AI controller 1200, and distributed to corresponding one or more cores (e.g., cores 1202 in FIG. 12) or processing elements. Some of the commands may instruct a DMA unit (e.g., DMA unit 1208 of FIG. 12) to load instructions and data from host memory (e.g., host memory 1221 of FIG. 12) into AI controller 1200. The loaded instructions may then be distributed to each core (e.g., core 1202 of FIG. 12) assigned with the corresponding task, and the one or more cores may process these instructions.

Figure 13:
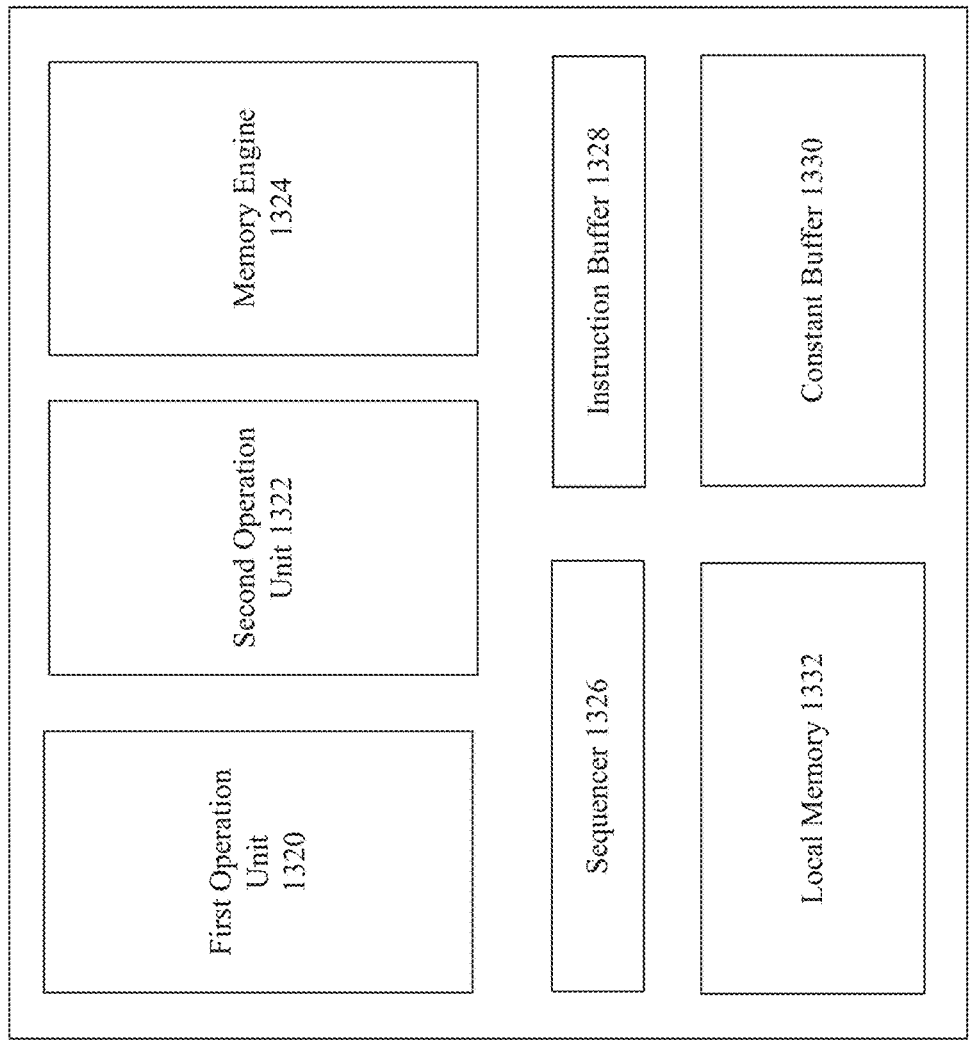
FIG. 13 is a schematic diagram illustrating an exemplary hardware accelerator core architecture, consistent with embodiments of the present disclosure.

It is appreciated that the first few instructions received by the cores 1202 may instruct the cores 1202 to load/store data from host memory 1221 into one or more local memories of the cores (e.g., local memory 1332 of FIG. 13). Each core 1202 may then initiate the instruction pipeline, which involves fetching the instruction (e.g., via a sequencer) from the instruction buffer, decoding the instruction (e.g., via a DMA unit 1208 of FIG. 12), generating local memory addresses (e.g., corresponding to an operand), reading the source data, executing or loading/storing operations, and then writing back results.

According to some embodiments, AI controller 1200 can further include a global memory (not shown) having memory blocks (e.g., 4 blocks of 8 GB second generation of high bandwidth memory (HBM2)) to serve as main memory. In some embodiments, the global memory can store instructions and data from host memory 1221 via DMA unit 1208. The instructions can then be distributed to an instruction buffer of each core assigned with the corresponding task, and the core can process these instructions accordingly.

In some embodiments, AI controller 1200 can further include a memory controller (not shown) configured to manage reading and writing of data to and from a specific memory block (e.g., HBM2) within global memory. For example, the memory controller can manage read/write data coming from core of another AI controller (e.g., from a DMA unit corresponding to the another AI controller) or from core 1202 (e.g., from a local memory in core 1202). It is appreciated that more than one memory controller can be provided in AI controller 1200. For example, there can be one memory controller for each memory block (e.g., HBM2) within global memory.

The memory controller can generate memory addresses and initiate memory read or write cycles. The memory controller can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

In the disclosed embodiments, AI controller 1200 of FIG. 12 can be utilized in various neural networks, such as convolutional neural networks (CNNs), deep neural networks (DNNs), recurrent neural networks (RNNs), or the like. In addition, some embodiments can be configured for various processing architectures, such as neural network processing units (NPUs), graphics processing units (GPUs), field programmable gate arrays (FPGAs), tensor processing units (TPUs), application-specific integrated circuits (ASICs), any other types of heterogeneous accelerator processing units (HAPUs), or the like.

FIG. 13 illustrates an exemplary core architecture, consistent with embodiments of the present disclosure. As shown in FIG. 13, core 1202 can include one or more operation units such as first and second operation units 1320 and 1322, a memory engine 1324, a sequencer 1326, an instruction buffer 1328, a constant buffer 1330, a local memory 1332, or the like.

First operation unit 1320 can be configured to perform operations on received data (e.g., feature maps). In some embodiments, first operation unit 1320 can include one or more processing units configured to perform one or more operations (e.g., multiplication, complex multiplication, addition, multiply-accumulate, element-wise operation, etc.). In some embodiments, first operation unit 1320 can be configured to accelerate execution of convolution operations or matrix multiplication operations.

Second operation unit 1322 can be configured to perform resizing operations, as described herein; a region-of-interest (ROI) operations; and the like. In some embodiments, second operation unit 1322 can include a resizing unit, a pooling data path, and the like. In some embodiments, second operation unit 1322 can be configured to cooperate with first operation unit 1320 to resize feature maps, as described herein. The disclosed embodiments are not limited to embodiments in which second operation unit 1322 performs resizing: in some embodiments, such resizing can be performed by first operation unit 1320.

Memory engine 1324 can be configured to perform a data copy within a corresponding core 1202 or between two cores. DMA unit 1208 can assist with copying data within a corresponding core or between two cores. For example, DMA unit 1208 can support memory engine 1324 to perform data copy from a local memory (e.g., local memory 1332 of FIG. 13) into a corresponding operation unit. Memory engine 1324 can also be configured to perform matrix transposition to make a matrix suitable for use in the operation unit.

Sequencer 1326 can be coupled with instruction buffer 1328 and configured to retrieve commands and distribute the commands to components of core 1202. For example, sequencer 1326 can distribute convolution commands or multiplication commands to first operation unit 1320, distribute pooling commands to second operation unit 1322, or distribute data copy commands to memory engine 1324. Sequencer 1326 can also be configured to monitor execution of a neural network task and parallelize sub-tasks of the neural network task to improve efficiency of the execution. In some embodiments, first operation unit 1320, second operation unit 1322, and memory engine 1324 can run in parallel under control of sequencer 1326 according to instructions stored in instruction buffer 1328.

Instruction buffer 1328 can be configured to store instructions belonging to the corresponding core 1202. In some embodiments, instruction buffer 1328 is coupled with sequencer 1326 and provides instructions to the sequencer 1326. In some embodiments, instructions stored in instruction buffer 1328 can be transferred or modified by command processor 1204.

Constant buffer 1330 can be configured to store constant values. In some embodiments, constant values stored in constant buffer 1330 can be used by operation units such as first operation unit 1320 or second operation unit 1322 for batch normalization, quantization, de-quantization, or the like.

Local memory 1332 can provide storage space with fast read/write speed. To reduce possible interaction with a global memory, storage space of local memory 1332 can be implemented with large capacity. With such capacity, most of data access can be performed within core 1202 with reduced latency caused by data access. In some embodiments, to minimize data loading latency and energy consumption, SRAM (static random access memory) integrated on chip can be used as local memory 1332. In some embodiments, local memory 1332 can have a capacity of 192 MB or above. According to some embodiments of the present disclosure, local memory 832 be evenly distributed on chip to relieve dense wiring and heating issues.

The AI computing architecture of the disclosed video processing system is not limited to the above-described architecture of AI controller 1200. Consistent with the disclosed embodiments, the AI algorithms (e.g., artificial neural network) may be hosted on a variety of electronic systems. For example, the AI algorithms could be hosted on a server, one or more nodes in a datacenter, a desktop computer, a laptop computer, a tablet, a smartphone, a wearable device such as a smartwatch, an embedded device, an IoT device, a smart device, a sensor, an orbital satellite, or any other electronic device capable of computation. Additionally, how the AI algorithms are hosted within a given device may vary as well. For example, in some embodiments the AI algorithms may be hosted and ran on a general processing unit of the device, such as a central processing unit (CPU), a graphics processing unit (GPU), or a general-purpose graphics processing unit (GPGPU). In other embodiments, the artificial neural network may be hosted and ran on a hardware accelerator of the device., such as a neural processing unit (NPU), a field programmable gate array (FPGA), or an application-specific integrated circuit (ASIC).

Figure 14:
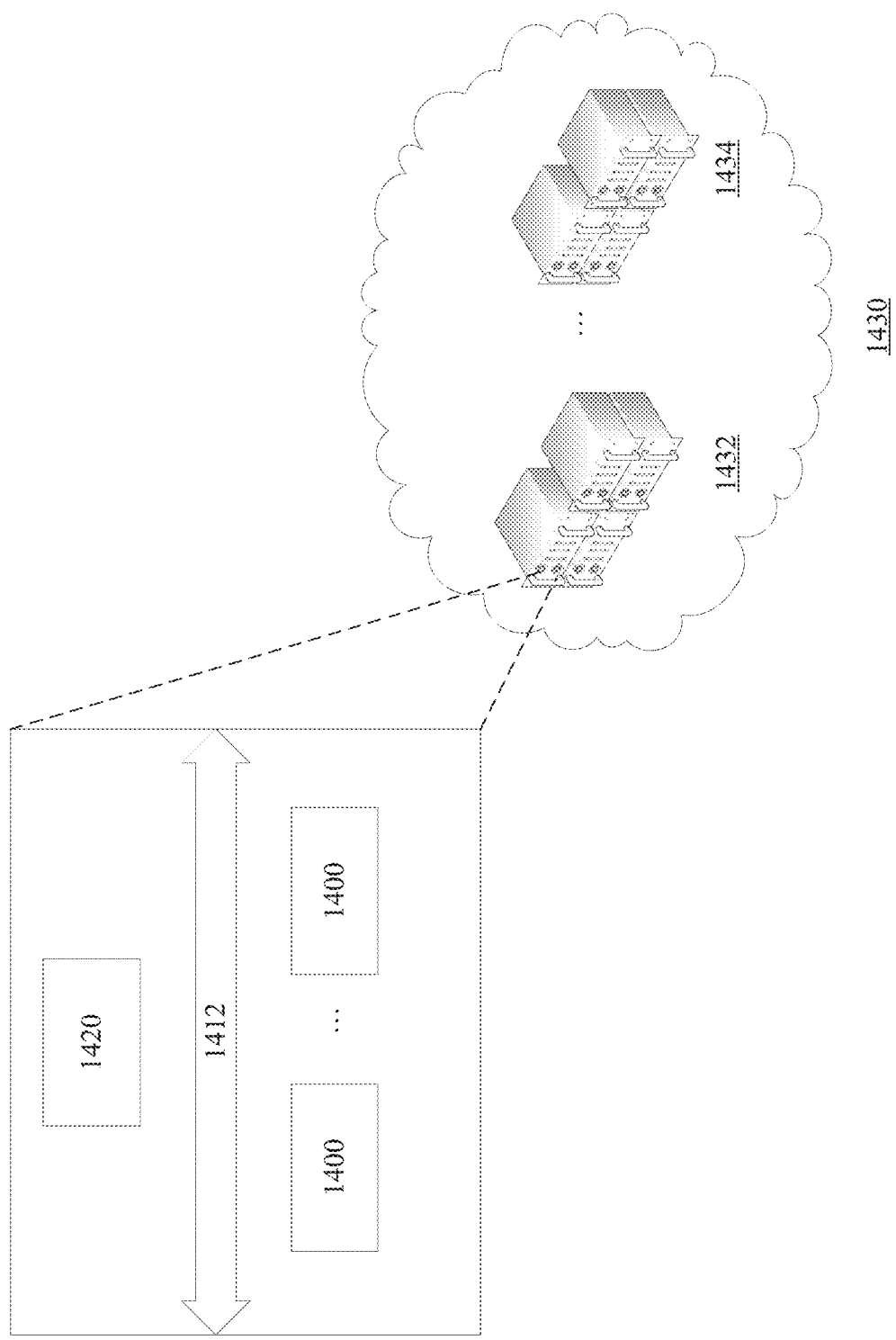
FIG. 14 is a schematic diagram illustrating an exemplary cloud system incorporating a neural network processing architecture, consistent with embodiments of the present disclosure.

Moreover, the AI computing of the disclosed video processing system can also be implemented in the form of cloud computing. FIG. 14 illustrates a schematic diagram of an exemplary cloud system incorporating AI controller 1200 (FIG. 12), consistent with embodiments of the present disclosure. As shown in FIG. 14, cloud system 1430 can provide a cloud service with artificial intelligence (AI) capabilities and can include a plurality of computing servers (e.g., 1432 and 1434). In some embodiments, a computing server 1432 can, for example, incorporate AI controller 1200 of FIG. 12. AI controller 1200 is shown in FIG. 14 in a simplified manner for simplicity and clarity.

With the assistance of AI controller 1200, cloud system 1430 can provide the extended AI capabilities of image recognition, facial recognition, translations, 3D modeling, and the like. It is appreciated that, AI controller 1200 can be deployed to computing devices in other forms. For example, AI controller 1200 can also be integrated in a computing device, such as a smart phone, a tablet, and a wearable device.

In some embodiments, a non-transitory computer-readable storage medium including instructions is also provided, and the instructions can be executed by a device (such as the disclosed encoder and decoder) for performing the above-described methods. Common forms of non-transitory media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The device can include one or more processors (CPUs), an input/output interface, a network interface, and/or a memory.

It is appreciated that the above-described embodiments can be implemented by hardware, or software (program codes), or a combination of hardware and software. If implemented by software, it can be stored in the above-described computer-readable media. The software, when executed by the processor, can perform the disclosed methods. The computing units and other functional units described in the present disclosure can be implemented by hardware, or software, or a combination of hardware and software. One of ordinary skill in the art will also understand that multiple ones of the above-described modules/units can be combined as one module/unit, and each of the above-described modules/units can be further divided into a plurality of sub-modules/sub-units.

The embodiments may further be described using the following clauses:

1. A video processing apparatus, comprising:
   a programmable hardware encoder configured to execute an encoding process on a plurality of input video frames; and
   a controller coupled with the programmable hardware encoder, the controller being configured to execute a set of instructions to cause the video processing apparatus to:
   determine first information of the plurality of input video frames; and
   adjust the encoding process based on the first information.
2. The video processing apparatus according to clause 1, wherein the first information comprises non-pixel information of the plurality of input video frames.
3. The video processing apparatus according to any one of clauses 1 and 2, wherein the controller is configured to execute the set of instruction to cause the video processing apparatus to:
   determine an initial motion vector for a coding block;
   determine a search range for the motion vector; and
   send the initial motion vector and search range to the programmable hardware encoder, wherein the programmable hardware encoder is configured to execute the encoding process using the initial motion vector and search range.
4. The video processing apparatus according to any one of clauses 1-3, wherein the set of instructions comprises a machine-learning algorithm for determining the non-pixel information.
5. The video processing apparatus according to any one of clauses 1-4, wherein the first information comprises information of a Region of Interest (ROI) in an input video frame of the plurality of input video frames, and the controller is configured to execute the set of instruction to cause the video processing apparatus to:

detect one or more Regions of Interest (ROIs) in the input video frame; and configure the programmable hardware encoder to encode ROIs using a first computational complexity and to encode non-ROIs using a second computational complexity different from the first computational complexity.

6. The video processing apparatus according to any one of clauses 1-5, wherein the controller is configured to execute the set of instruction to cause the video processing apparatus to:

generate a segmentation of an input video frame of the plurality of input video frames; and send information of the segmentation to the programmable hardware encoder, wherein the programmable hardware encoder selects at least one of a partition size or a coding mode for a coding block, based on the segmentation.

7. The video processing apparatus according to clause 6, wherein the programmable hardware encoder is configured to use a first partition size at a boundary of a segment and to use a second partition size within the segment, the first partition size being smaller than the second partition size.

8. The video processing system according to any one of clauses 6 and 7, wherein the programmable hardware encoder is configured to determine a coding mode for a coding block within a segment, based on one or more coding modes used for other coding blocks within the same segment.

9. The video processing apparatus according to any one of clauses 1-8, wherein the plurality of input video frames are generated by a decoder during a video transcoding process, and the controller is configured to execute the set of instruction to cause the video processing apparatus to:

receive, from the decoder, information indicating at least one of a number of bits or an average quantization parameter for an input video frame of the plurality of input video frames;

determine a computational complexity for the input video frame, based on the at least one of the number of bits or the average quantization parameter; and adjust a bitrate of the encoding process based on the computational complexity.

10. The video processing apparatus according to any one of clauses 1-9, wherein the plurality of input video frames are generated by a decoder during a video transcoding process, and the controller is configured to execute the set of instruction to cause the video processing apparatus to:

receive, from the decoder, information indicating at least one of an original motion vector or an original coding mode for an input video frame of the plurality of input video frames;

determine at least one of a target motion vector or a target coding mode, based on the at least one of the original motion vector or the original coding mode, respectively; and perform the motion estimation and mode decision of the encoding process based on the at least one of the target motion vector or the target coding mode.

11. The video processing apparatus according to any one of clauses 1-10, wherein the programmable hardware encoder is a first encoder, and the controller is configured to execute the set of instruction to cause the video processing apparatus to:

receive a coding parameter used by a second encoder for encoding one or more of the plurality of input video frames; and adjust the coding parameter and send the adjusted coding parameter to the programmable hardware encoder, wherein the programmable hardware encoder is configured to execute the encoding process based on the adjusted coding parameter.

12. The video processing apparatus according to clause 11, wherein the coding parameter comprises at least one of a motion vector or a coding mode.

13. The video processing apparatus according to any one of clauses 1-12, wherein the plurality of input video frames are generated by a decoder during a video transcoding process, and the controller is configured to execute the set of instruction to cause the video processing apparatus to:

receive, from the decoder, information indicating a coding parameter used for an input video frame of the plurality of input video frames;

detect an ROI in the input video frame, based on the coding parameter; and configure the programmable hardware encoder to enhance image quality in the ROI.

14. The video processing apparatus according to clause 13, wherein the coding parameter comprises at least one of a motion vector or a quantization parameter.

15. The video processing apparatus according to any one of clauses 1-14, wherein the controller is configured to execute the set of instruction to cause the video processing apparatus to:

assign a weight to an input video frame of the plurality of input video frames, based on audio information associated with the input video frame;

determine an image quality proportional to the weight; and configure the programmable hardware encoder to encode the input video frame according to the determined image quality.

16. The video processing apparatus according to any one of clauses 1-15, wherein the controller is configured to execute the set of instruction to cause the video processing apparatus to:

receive at least one of a motion vector or an estimated rate-distortion information from the programmable hardware encoder;

determine at least one of a coding mode or a motion vector based on the received motion vector or the estimated rate-distortion information; and send the at least one of the coding mode or the motion vector to the programmable hardware encoder, wherein the programmable hardware encoder is configured to execute the encoding process according to the at least one of the coding mode or the motion vector.

17. The video processing apparatus according to any one of clauses 1-16, wherein the controller is configured to execute the set of instruction to cause the video processing apparatus to:

determine a coding-tree-unit (CTU) structure for an input video frame of the plurality of input video frames; and send, to the programmable hardware encoder, information indicating the CTU structure, wherein the programmable hardware encoder is configured to partition the input video frame according to the CTU structure.

18. The video processing apparatus according to any one of clauses 1-17, wherein the controller is configured to execute the set of instruction to cause the video processing apparatus to:
determine a first un-coded I-frame in the plurality of input video frames;
determine one or more additional un-coded I-frames in the plurality of input video frames;
index the first and additional un-coded I-frames;
determine a group of pictures (GOP) according to the indexes of the first and additional un-coded I-frames; and
configure the programmable hardware encoder to encode the plurality of input video frames according to the determined GOP.

19. The video processing apparatus according to clause 18, wherein the plurality of input video frames are generated by a decoder during a video transcoding process, and the controller is configured to execute the set of instruction to cause the video processing apparatus to:
receive, from the decoder, information indicating intra coding units (CUs) used for encoding the plurality of input video frames; and
determine the first un-coded I-frame based on the intra CUs.

20. The video processing apparatus according to any one of clauses 18 and 19, wherein the set of instructions comprises a machine-learning algorithm for determining the first un-coded I-frame.

21. The video processing apparatus according to any one of clauses 1-20, wherein the controller is configured to execute the set of instruction to cause the video processing apparatus to:
determine similarity of the plurality of input video frames;
assign a bit budget to each of the plurality of input video frames, based on the similarity of the plurality of input video frames; and
send the bit budgets to the programmable hardware encoder, wherein the programmable hardware encoder is configured to encode the plurality of input video frames according to the corresponding bit budgets.

22. The video processing apparatus according to clause 21, wherein the set of instructions comprises a reinforcement-learning algorithm for determining the similarity of the plurality of input video frames.

23. The video processing apparatus according to any one of clauses 1-22, wherein the controller is configured to execute the set of instruction to cause the video processing apparatus to:
determine similarity of the plurality of input video frames;
determine one or more reference frames, based on the similarity of the plurality of input video frames; and
send information of the one or more reference frames to the programmable hardware encoder, wherein the programmable hardware encoder is configured to encode the plurality of input video frames using the one or more reference frames.

24. The video processing apparatus according to clause 23, wherein the set of instructions comprises a machine-learning algorithm for determining the similarity of the plurality of input video frames.

25. The video processing apparatus according to any one of clauses 1-24, wherein the controller is configured to execute the set of instruction to cause the video processing apparatus to:
detect one or more ROIs in an input video frame of the plurality of input video frames;
set at least one of a coding unit or a prediction unit based on the one or more ROIs; and
send information of the at least one of the coding unit or the prediction unit to the programmable hardware encoder, wherein programmable hardware encoder is configured to execute the encoding processing using the at least one of the coding unit or the prediction unit.

26. The video processing apparatus according to any one of clauses 1-25, wherein the controller is configured to execute the set of instruction to cause the video processing apparatus to:
generate a segmentation of an input video frame of the plurality of input video frames;
set at least one of a coding unit or a prediction unit based on the segmentation of the input video frame; and
send information of the at least one of the coding unit or the prediction unit to the programmable hardware encoder, wherein programmable hardware encoder is configured to execute the encoding processing using the at least one of the coding unit or the prediction unit.

27. A non-transitory computer-readable storage medium storing a set of instructions that are executable by one or more processors coupled with a programmable hardware encoder, wherein the execution of the set of instructions causes the programmable hardware encoder to:
determine first information of a plurality of input video frames; and
adjust, based on the first information, an encoding process performed by the programmable hardware encoder on the plurality of input video frames.

28. A computer-implemented method, comprising:
executing, by a programmable hardware encoder, an encoding process on a plurality of input video frames;
determining, by a controller coupled with the programmable hardware encoder, first information of the plurality of input video frames; and
adjusting, by the controller, the encoding process based on the first information.

29. A video processing apparatus, comprising:
a programmable hardware decoder configured to execute a decoding process on coded video data, to generate decoded data; and
a controller coupled with the programmable hardware decoder, the controller being configured to execute a set of instructions to cause the video processing apparatus to:
determine first information of the coded video data; and
adjust the decoding process based on the first information.

30. The video processing apparatus according to clause 29, wherein the first information comprises non-pixel information of the coded video data.

31. The video processing apparatus according to any one of clauses 29 and 30, wherein the set of instructions comprises a machine-learning algorithm for determining the non-pixel information.

32. The video processing apparatus according to any one of clauses 29-31, wherein the controller is configured to execute the set of instruction to cause the video processing apparatus to:

receive, from the programmable hardware decoder, a plurality of motion vectors associated with a plurality of coding blocks in a coded frame;

determine a global motion parameter for the coded frame, based on the plurality of motion vectors;

determine whether a camera jitter is present in the decoded data; and in response to a camera jitter being determined to be present in the coded frame, perform image stabilization on the decoded data, based on the global motion parameter.

33. The video processing apparatus according to any one of clauses 29-32, wherein the controller is configured to execute the set of instruction to cause the video processing apparatus to:

receive, from the programmable hardware decoder, a plurality of coding parameters for the coded video data; and execute a machine-learning algorithm to recognize and track an object represented by the decoded data, based on the plurality of coding parameters.

34. The video processing apparatus according to clause 33, wherein the controller is configured to execute the set of instruction to cause the video processing apparatus to:

detect a plurality of attributes of the object through machine learning; and identify, through machine learning, an event of the object based on the plurality of attributes of the object.

35. The video processing apparatus according to any one of clauses 29-34, wherein the controller is configured to execute the set of instruction to cause the video processing apparatus to:

receive, from the programmable hardware decoder, a plurality of motion vectors and coding modes associated with a plurality of coding blocks in a coded frame;

determine a method to conceal error, based on the plurality of motion vectors and coding modes; and in response to an error being determined to be present in the coded frame, perform error concealment in the decoding process, based on the determined method.

In addition to implementing the above method by using computer-readable program codes, the above method can also be implemented in a form of a logic gate, a switch, an ASIC, a programmable logic controller, and an embedded microcontroller. Therefore, such a controller can be considered as a hardware component, and apparatuses included in the controller and configured to implement various functions can also be considered as structures inside the hardware component. Or, the apparatuses configured to implement various functions can even be considered as both software modules configured to implement the method and structures inside the hardware component.

This disclosure can be described in a general context of a computer-executable instruction executed by a computer, for example, a program module. Generally, the program module includes a routine, a program, an object, an assembly, a data structure, a class, or the like used for executing a specific task or implementing a specific abstract data type. Embodiments of the disclosure can also be implemented in distributed computing environments. In the distributed computing environments, a task is executed by using remote processing devices connected through a communications network. In the distributed computing environments, the program module can be located in local and remote computer storage media, including a storage device.

It should be noted that the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as examples only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A video processing apparatus, comprising:
a programmable hardware encoder configured to execute an encoding process on a plurality of input video frames; and
a controller coupled with the programmable hardware encoder, the controller being configured to execute a set of instructions to cause the video processing apparatus to:
determine first information of the plurality of input video frames, wherein the first information comprises non-pixel information that includes at least one of segmentation information, prediction mode, or motion vectors; and
adjust the encoding process based on the first information.

2. The video processing apparatus according to claim 1, wherein the controller is configured to execute the set of instruction to cause the video processing apparatus to:
extract the non-pixel information by using one of the prediction mode or the motion vector as encoder output; and
guide the encoding process based on the encoder output.

3. The video processing apparatus according to claim 1, wherein the controller is configured to execute the set of instruction to cause the video processing apparatus to:
determine an initial motion vector for a coding block;
determine a search range for the motion vector; and
send the initial motion vector and search range to the programmable hardware encoder, wherein the programmable hardware encoder is configured to execute the encoding process using the initial motion vector and search range.

4. The video processing apparatus according to claim 2, wherein the set of instructions comprises a machine-learning algorithm for determining the non-pixel information.

5. A non-transitory computer-readable storage medium storing a set of instructions that are executable by one or more processors coupled with a programmable hardware encoder, wherein the execution of the set of instructions causes the programmable hardware encoder to:

determine first information of a plurality of input video frames, wherein the first information comprises non-pixel information includes at least one of segmentation information, prediction mode, or motion vectors; and adjust, based on the first information, an encoding process performed by the programmable hardware encoder on the plurality of input video frames.

6. A computer-implemented method, comprising:

executing, by a programmable hardware encoder, an encoding process on a plurality of input video frames;

determine, by a controller coupled with the programmable hardware encoder, first information of the plurality of input video frames, wherein the first information comprises non-pixel information includes at least one of segmentation information, prediction mode, or motion vectors; and adjusting, by the controller, the encoding process based on the first information.

* * * * *